(12) United States Patent
Richards

(10) Patent No.: US 11,786,766 B2
(45) Date of Patent: Oct. 17, 2023

(54) DISPOSABLE FACE MASK WITH INTEGRATED TIE-ON FACE MASK STRAPS

(71) Applicant: Jeffrey S. Richards, League City, TX (US)

(72) Inventor: Jeffrey S. Richards, League City, TX (US)

( * ) Notice: Subject to any disclaimer, the term of this patent is extended or adjusted under 35 U.S.C. 154(b) by 189 days.

(21) Appl. No.: 17/550,765

(22) Filed: Dec. 14, 2021

(65) Prior Publication Data

US 2022/0193465 A1 Jun. 23, 2022

Related U.S. Application Data

(60) Provisional application No. 63/126,657, filed on Dec. 17, 2020.

(51) Int. Cl.
*A62B 18/00* (2006.01)
*A62B 18/08* (2006.01)
(Continued)

(52) U.S. Cl.
CPC ........ *A62B 18/084* (2013.01); *A41D 13/1115* (2013.01); *A62B 23/02* (2013.01);
(Continued)

(58) Field of Classification Search
CPC .............. B29K 2023/12; B65H 16/005; B29D 99/0071; A41D 13/1115; B32B 2437/00;
(Continued)

(56) References Cited

U.S. PATENT DOCUMENTS 3,971,369 A * 7/1976 Aspelin .............. A41D 13/1115
128/206.19
5,107,547 A * 4/1992 Scheu ................ A41D 13/1184
2/9

(Continued)

FOREIGN PATENT DOCUMENTS

EP 1575388 B1 2/2009
JP 2008143602 A 6/2008

*Primary Examiner* — Steven O Douglas
(74) *Attorney, Agent, or Firm* — Crowell & Moring LLP

(57) ABSTRACT

A disposable face mask includes an upper portion of the face mask and a lower portion of the face mask, the upper portion and lower portion of the face masks each adjoin monolithically formed therewith face mask straps defined by perforations in a web of material used to form the face mask and straps, wherein the perforations allow the straps to be partially separated and utilized for securing said face mask to a wearer's face. The disposable face mask may be made by perforating patterns into a web of materials to define the face mask straps and face mask body that are formed monolithically from the web of materials. The face masks may be wound on a roll for dispensing by tearing off from the roll and then separating the straps at the perforations. Alternatively, the face mask borders may be cut-through to allow dispensing of the face masks individually from bulk packaging, where the face mask is removed from the package and the straps are separated at the perforations to allow the face mask to be secured to the wearer's face by tying the straps behind the wearer's head.

20 Claims, 6 Drawing Sheets

(51) Int. Cl.
  *B29D 99/00* (2010.01)
  *B32B 5/26* (2006.01)
  *B32B 5/02* (2006.01)
  *B32B 37/20* (2006.01)
  *B32B 38/04* (2006.01)
  *A62B 23/02* (2006.01)
  *B65H 16/00* (2006.01)
  *A41D 13/11* (2006.01)
  *B29K 23/00* (2006.01)

(52) U.S. Cl.
  CPC .......... *B29D 99/0071* (2013.01); *B32B 5/022* (2013.01); *B32B 5/267* (2021.05); *B32B 5/269* (2021.05); *B32B 37/203* (2013.01); *B32B 38/04* (2013.01); *B65H 16/005* (2013.01); *B29K 2023/12* (2013.01); *B32B 2038/047* (2013.01); *B32B 2262/0253* (2013.01); *B32B 2307/728* (2013.01); *B32B 2437/00* (2013.01)

(58) Field of Classification Search
  CPC ...... B32B 2307/728; B32B 2262/0253; B32B 2038/047; B32B 38/04; B32B 37/203; B32B 5/022; B32B 5/032; A62B 23/02; A62B 18/084
  See application file for complete search history.

(56) References Cited

U.S. PATENT DOCUMENTS

| | | | |
|---|---|---|---|
| 5,934,275 A * | 8/1999 | Gazzara | A41D 13/1115 128/206.13 |
| 6,062,220 A * | 5/2000 | Whitaker | A62B 18/08 128/206.19 |
| 7,032,751 B2 | 4/2006 | Bell et al. | |
| 7,044,131 B2 | 5/2006 | Griesbach et al. | |
| 8,061,356 B2 | 11/2011 | Bowen | |
| 9,616,258 B2 | 4/2017 | Tsuei | |
| 2005/0051567 A1 | 3/2005 | Bell et al. | |
| 2014/0224261 A1 | 8/2014 | Tsuei | |

* cited by examiner

DISPOSABLE FACE MASK WITH INTEGRATED TIE-ON FACE MASK STRAPS

CROSS-REFERENCE

This application claims the benefit of U.S. provisional application No. 63/126,657, filed on Dec. 17, 2020.

BACKGROUND

1. Technical Field Text

This disclosure relates to face masks, breathing filter media, and methods for manufacturing and dispensing the same.

2. Background Information

Face masks have largely been, to this point in time, important to the medical and manufacturing industries. However, in this era of COVID-19, there is a new awareness of the importance of wearing face masks by the general public. High quality face masks generally available, such as N95 masks, are expensive and cumbersome to dispense. Most low-cost non-woven face masks are dispensed one at a time from pop-up dispensers or boxes. However, these are cumbersome because the face mask straps are frequently intertwined with other face masks' straps and pulling out one face mask is not always possible. Sometimes an attempt to pull out one face mask leads to a handful of face masks being dispensed, due to their being clumped together due to face mask strap entanglement. U.S. Pat. No. 7,032,751 B2, to Bell et al., which is incorporated by reference herein, discloses a face mask dispenser that provides masks on a roll that can be torn off one at a time, like a roll of paper towel. Bell discloses low-cost face masks on the roll with non-adjustable ear loops and are one-size-fits-all. No two wearers have the same face size and shape. What is needed is a low-cost face mask that is easily dispensable and provides the flexibility needed to provide a proper fitment for a variety of face sizes and shapes.

BRIEF SUMMARY

The present disclosure describes a disposable face mask that includes an upper portion of the face mask and a lower portion of the face mask, the upper portion and lower portion of the face mask each adjoin monolithically formed therewith face mask straps defined by perforations in a web of material used to form the face mask and straps, wherein the perforations allow the straps to be partially separated and utilized for securing said face mask to a wearer's face.

The present disclosure describes a method of making a face mask that includes providing a web of material, providing a plurality of perforations in a first area of the web of materials to define face mask straps that adjoin a second area of the web of materials that defines the face mask body. The method may include welding the web of material at select locations to adhere together layers in the web of material together at a border between a first face mask and a second face mask on the web of material, perforating the web of material along the border such that the face mask may be separated from an adjacent face mask formed in the web of material, wherein the plurality of perforations defining the straps allow the straps to be pulled away from the face mask body yet remained adjoined to the face mask body, whereby a wearer may secure the face mask to the wearer's head with said straps.

DETAILED DESCRIPTION OF THE DRAWINGS AND THE PRESENTLY PREFERRED EMBODIMENTS

Figure 1:
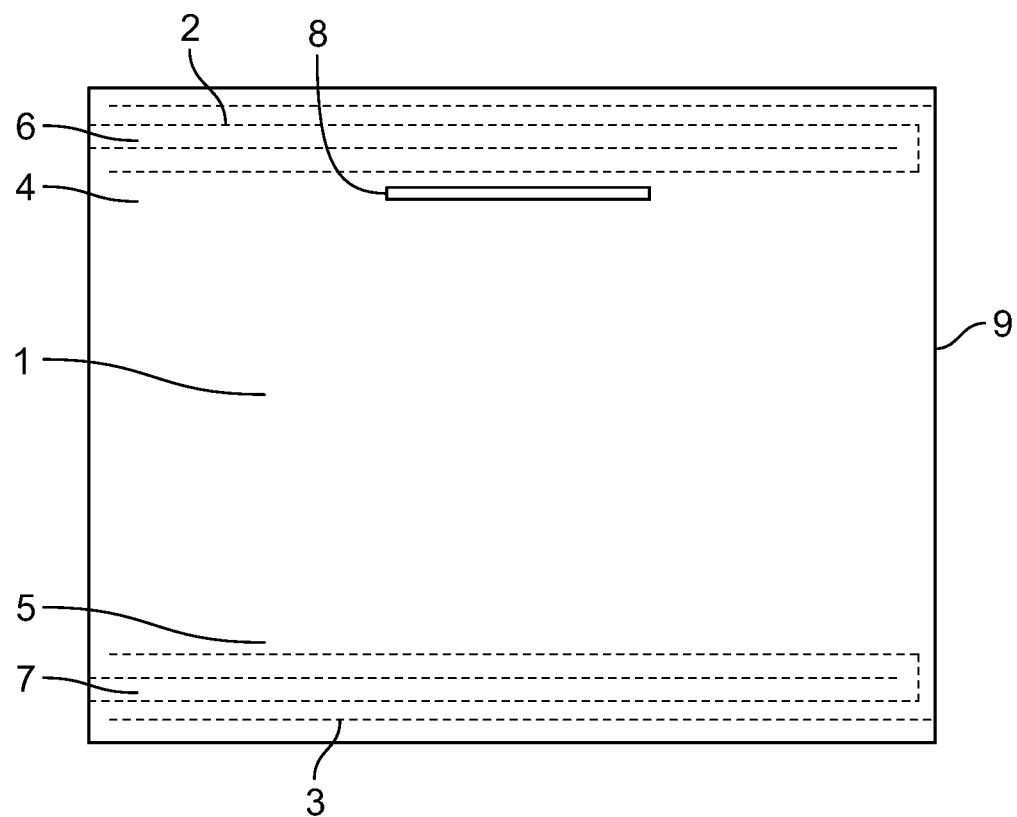
FIG. 1 is an exemplary layout of a face mask before shaping.

The face mask may be manufactured on a roll of filter media and rolled up for dispensing one at a time off of a roll. Instead of ear loops, the face mask has four straps—two straps on one side, or one end, of the mask at the top and bottom, and two straps at the opposite side, or opposite end, of the mask at the top and bottom. When the face mask is placed on the face, the two top straps (the strap on each side or end of the mask disposed at the top of the mask) may be tied or secured behind the upper part of the wearer's head, and the two bottom straps (the strap on each side or end of the mask disposed at the bottom of the mask) may be tied or secured behind the lower part of the wearer's head. The face mask itself may be fully integrated in that the securing straps are actually integrally formed from part of the dispensed face mask. For example, when initially dispensed from the roll of material, the body of the face mask and all four straps may form one, continuous web of material, for example, in the shape of a square or rectangle, that makes up the face mask. Just as a paper towel has a top and bottom as it is dispensed from the roll, the portions disposed at the top and bottom of this face mask has face mask straps that are part of the single, continuous web of dispensed material.

After pulling the face mask away from the roll, the face mask has been formed with perforations that allow it to be easily torn away from next mask in the roll of masks. The face mask includes additional perforations that define the two upper straps and the two lower straps, which allows the wearer to pulls the tabs for the strap ends and separate the straps from the face mask. The straps are perforated up until the point in which they attach with the body of the face mask. This makes it easy for the wearer to separate them. After separating the straps from the body of the face mask, the wearer spreads the face mask over the face and ties the previously integrated straps, securing the face mask to the face. Having pairs of individual straps with free ends to be tied behind the wearer's head and/or neck, instead of an ear loop, allows the face mask to be infinitely adjustable to accommodate a wide variety of faces, heads and tying preferences. Optionally, an integrated nose piece (made of an aluminum strip, steel wire, or some other malleable material) may be included on the face mask so it can be pinched over the nose to help the face mask follow the contours of the nose and cheeks for a more secure and tighter fit.

The face mask material is preferably made from a non-woven fibrous material. The face mask material can be made from any material which has suitable air filtering properties, from simple paper material to blown polyethylene. See for example, U.S. Pat. No. 7,032,751 B2, which is incorporated by reference herein in its entirety, for a partial listing of such materials. The mask may comprise, for example, three layers, such as a meltblown polypropylene inner layer (e.g., to be positioned against the face of the wearer), a hydrophilic spunbond polypropylene middle layer, and a spunbond polypropylene outer layer. Due to the stress on the face mask straps, a reinforcing layer of plastic, polyethylene, polypropylene, heterogeneous multilayer film, or any material which has flexibility, bonding ability and tensile strength, can be used as an overlay on the upper and lower portions of the face mask where the straps are formed.

During the manufacturing process, this reinforcing layer can be bonded to the upper and lower portions of the face mask. In addition to giving tensile strength to the straps, it can extend over the nose area of the mask to aid in the securing of the nose bridge contouring piece of metal or plastic. The materials used in the face mask may have different or similar melting temperatures depending on the design of the mask. For example, for pleated, folded face masks, it may be desired to have materials in the layers with properties that allow the masks to be heat welded through the depth of materials along the borders to retain the folds. On the other hand, for example, for duck-bill face masks, the upper portion of the face mask overlaps with the lower portion of the face mask on the web of material. For materials used in a duck-bill face mask, it may be desirable to have an inner layer of much higher melt temperature polymer than the middle and outer layer so that low heat may be used to heat weld features on the outer layer of the face mask or to the inner layers, such as the straps, without causing the inner layer to melt or weld to itself, except where high temperature or ultrasonic welding is used to melt and weld all layers together such as along the borders.

A variety of face mask shapes may be accommodated with the methods and configurations described herein. The face masks may be manufactured with pleats, folds, accordion-style folds, or fashioned into a duck-bill style face mask. A wide variety of face mask shapes may be dispensed on a roll and use the functioning of the integrally formed face mask straps. The face mask may be fashioned with the appropriate dimensions as found in conventional face masks in order to provide appropriate face coverage.

The face mask may, for example, be dispensed from a tube, paper-towel style, and separated by tearing at the perforations. See for example, U.S. Patent Application Publication No. 2005/0051567 A1, which is incorporated by reference herein in its entirety, for an example of a tube roll dispenser. Alternatively, the face mask may be pre-cut and packaged separately stacked up so they may be pulled from a box one at a time, similar to a tissue dispenser. See for example, U.S. Pat. No. 9,616,258, which is incorporated by reference herein in its entirety, for an example of box style dispense.

Referring to FIG. 1, a layout of an exemplary face mask (1) demonstrates the face mask with the upper (6) and lower (7) face mask straps formed on the upper portion (4) and lower portion (5) and defined by the upper (2) and lower (3) perforation patterns, respectively. The upper portion (4) may comprise two upper straps (6) and the lower portion (5) may comprise two lower straps (7) such that the face mask (1) has a total of four face mask straps (6, 7). A nose bridge contouring strip (8), also referred to as a nose contour piece, may be placed across the upper portion (4) of the face mask, for example, near a lower edge of the upper portion (4) closest to the body of the face mask (1). The body of the face mask (1) is the central portion of the mask (1) extending between the upper (4) and lower (5) portions, which covers the face of the end user when worn. An overlaid reinforcing layer may be placed on the upper portion (4) and lower portion (5) where the face mask straps are defined to strengthen or reinforce the straps (6, 7). The body and the upper and lower portions (4, 5) that comprise the upper and lower straps (6, 7), respectively, may all be formed integrally in to one continuous piece of material. The straps (6, 7) may be integrated monolithically with the upper and lower portions (4, 5) connected to the body of the face mask (1).

The left and right borders (9), which also may be referred to as edges, of the face mask are defined by perforations or cuts so that the face mask (1) may be torn away from adjacent face mask (1) when disposed on, for example, a roll comprising multiple face mask (1). In this image, the face mask (1) is in the blank state as found on the roll, not yet shaped in order to help show how the features would be seen on the web of material that is in a manufacturing process not rolled. In this exemplary configuration, the upper straps (6) and lower straps (7) are defined by the perforations (2, 3) to comprise approximately three lengths of the face mask (1) by having the shape of a path zig-zagging or twisting and turning back and forth three times across the length of the face mask, wherein the length of the face mask (1) is the distance between the left and right borders (9) of the mask. When separated, each one of the upper and lower straps (6, 7) may connect to the face mask (1) at opposing corners of the face mask (1). The perforation patterns (2, 3) form the straps (6, 7) within the upper and lower portions (4, 5) of the face mask such that they are integrated monolithically with the body of the face mask (1) before the end user separates the straps (6, 7) at the perforations (2, 3). The perforation patterns (2, 3) may be modified to change the length of the straps (6, 7) as may be desired. For example, the straps (6, 7) may comprise two lengths of the face mask, or four lengths of the face mask. The width of the strap may also be modified and may have a variable width along the length of the strap from the proximate end (the end of the strap (6, 7) disposed closest to and integrated with the mask body) to the distal free end (the end of the strap (6, 7) disposed farthest away from the body of the face mask (1)). Stronger materials used in the face mask or use of a reinforcing layer may allow for thinner straps, whereas weaker materials without a reinforcing layer may require wider straps to have sufficient tensile strength to withstand the stress of being torn away at the perforations, being tied in a knot while the mask is worn for long periods, or to avoid tears where the straps adjoin the face mask body. For example, the reinforcing layer may have a tensile strength in the range of 20-35 MPa.

Figure 2:
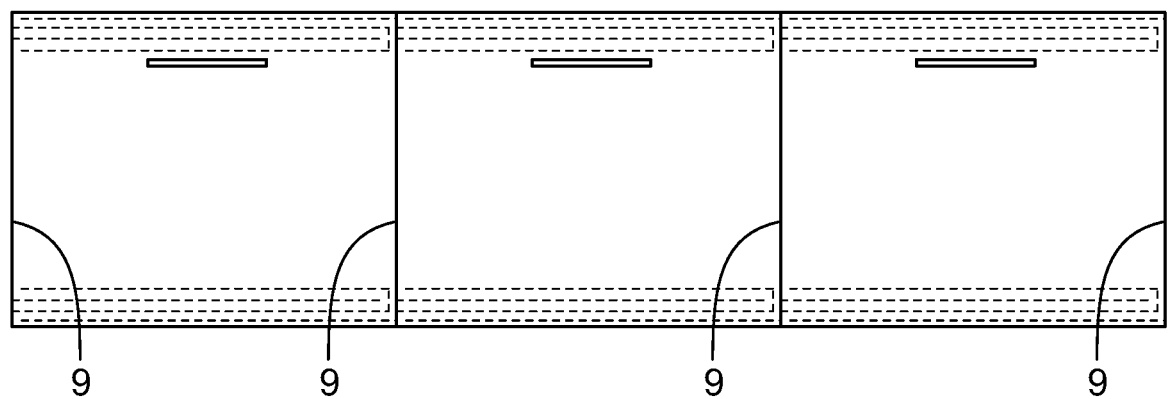
FIG. 2 is an exemplary layout of contiguous face masks patterned on a web of material ready for ultimate shape and end-user dispensing.
Figure 3:
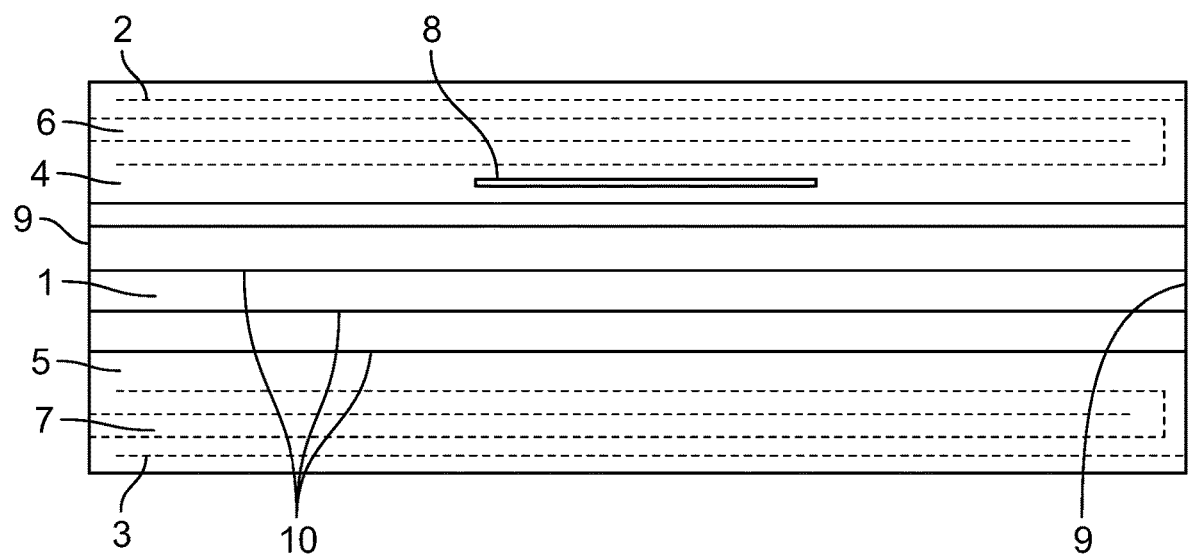
FIG. 3 is an exemplary individual face mask with accordion-style folds.
Figure 4:
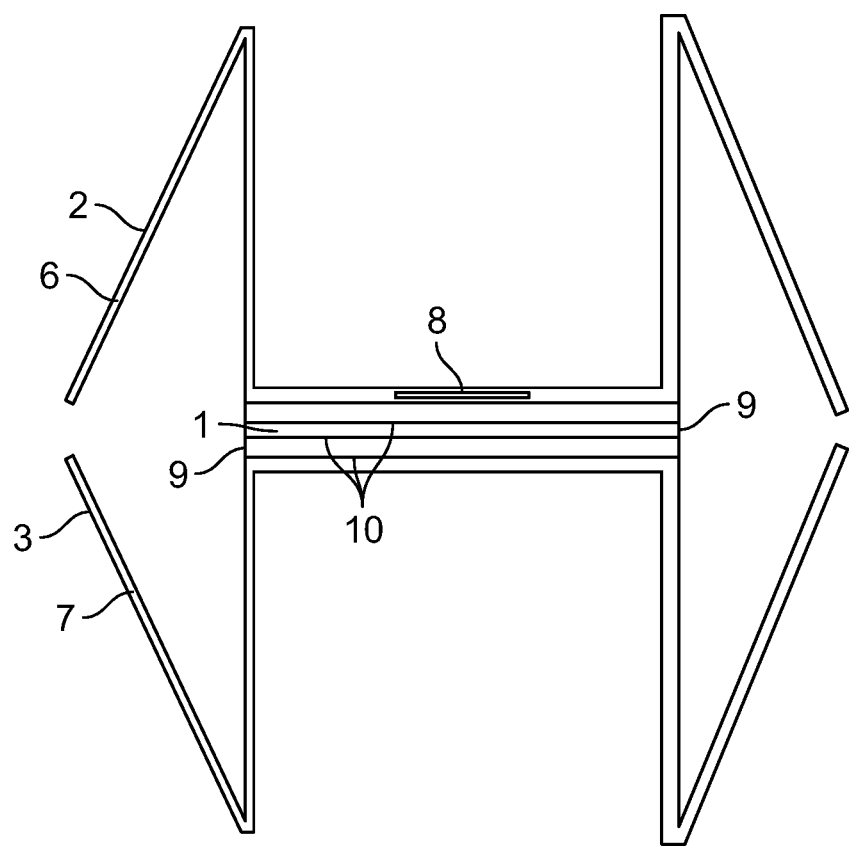
FIG. 4 is an exemplary accordion-style face mask with straps pulled from face mask for ready use.
Figure 5:
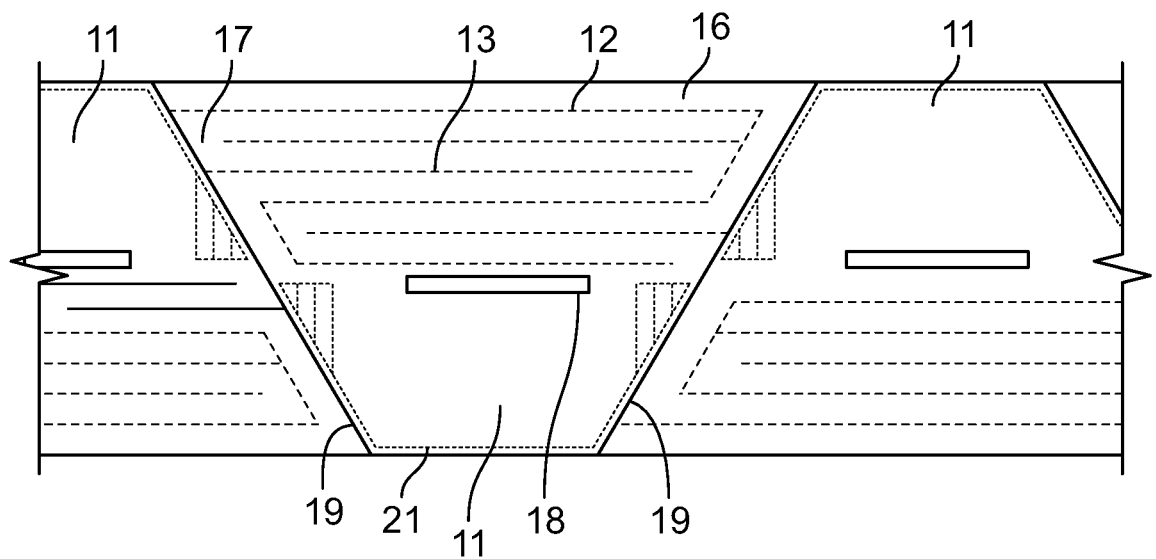
FIG. 5 is an exemplary duck bill style face mask patterned on a web of material.
Figure 6:
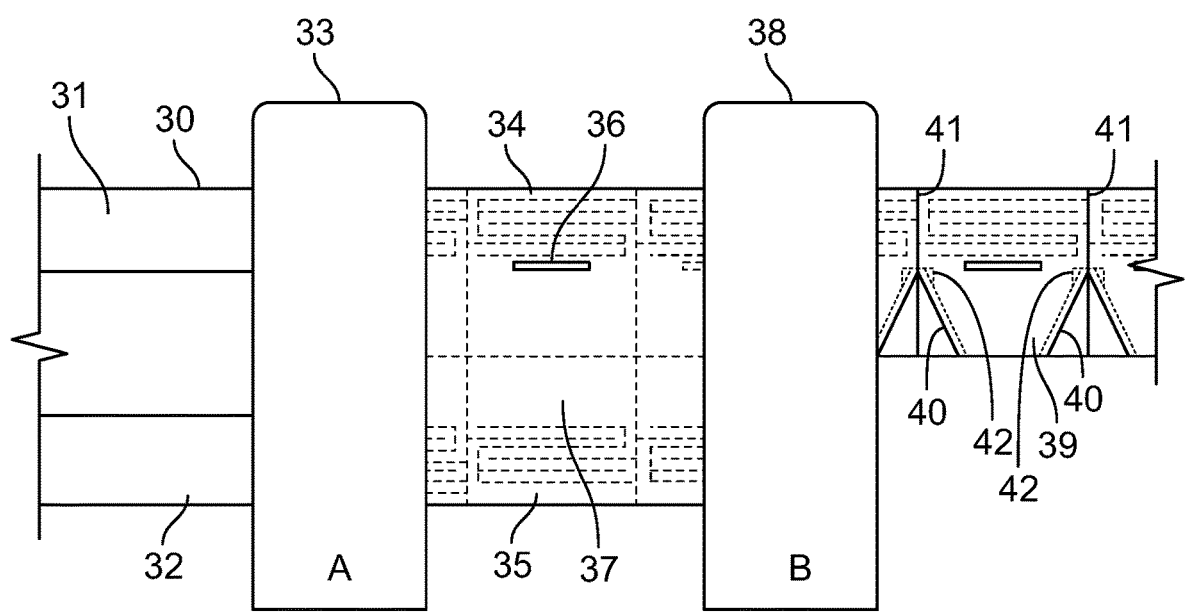
FIG. 6 is an exemplary method for making a duck bill style face mask according to an embodiment of the present disclosure.

Referring to FIG. 2, the face masks (1), for example, face masks (1) such as the ones shown in FIGS. 1, 3, and 4 or face masks (11) as shown in FIGS. 5 and 6, are shown on a web of material as they would come off the assembly line manufacturing equipment, for example, before being folded or having accordion folds (10) (shown in FIG. 3) set in. The masks (1) may be single or multiple layers of non-woven materials. The reinforcing layers may be disposed on one or both of the outer surfaces of the masks (1) or may be embedded between layers of the masks (1). Likewise the malleable nose piece (8) of each mask (1) may be on the surface of the mask (1), or preferably embedded between layers of the masks (1). See for example, U.S. Pat. No. 8,061,356 B2, which is incorporated by reference herein in its entirety, for an example of malleable nose piece and lists example materials. The nose piece (8) may be disposed on a layer using an adhesive, such as a hot melt glue, so it stays in position. Alternatively, the nose piece (8) may be multiple layers with an outer layer that is compatible with a layer of the face mask (1) such it may be heat bonded or welded to a layer of the face mask (1). While the perforations (2, 3) for the straps (6, 7) and the face mask borders (9) may not be embossed into the face masks (1) yet, the FIG. 2 demonstrates where they would go. The masks (1) may have the folds (10) (shown in FIG. 3), which may comprise pleats or accordion-style folds, set in the face mask body area, then the borders (9) may be heat welded and perforated.

Referring to FIG. 3, a face mask (1), for example a face mask (1) designed in accordance with the face mask (1) shown in FIGS. 1 and 2, is shown with accordion-style or pleated folds (10). The face mask (1) can be torn off the roll of face masks, for example, as shown in FIG. 2, at the border perforations (9) by the end user. If the manufacturer chooses, it may opt for one-at-a-time dispensing and pre-cut the face masks (1) off at the border perforations (9) in preparation for boxing.

Referring to FIG. 4, a pleated or accordion-style folded face mask (1) is shown with the face mask straps (6, 7) separated from the body of the face mask (1) in preparation for wearing. The face mask (1) shown in FIG. 4 may be the face mask (1) shown in FIG. 1, 2, or 3 once the face mask (1) has been fully manufactured, formed, dispensed, and the straps (6, 7) separated by the end user. The face mask straps (6, 7) may be separated from the face mask body by tearing through the perforations (2, 3) that define the straps (6, 7). The optional reinforcement layer across the upper and lower portions (4,5) ensures the integrity of the straps (6, 7) while being torn away at the perforations (2, 3) and then under load once they are tied together. The straps (6, 7) shown in this embodiment have a length of approximately two face masks lengths, in contrast to the embodiment shown in FIG. 1 that would have a strap with a length of three face masks when separated at the perforations.

Referring to FIG. 5, an exemplary duck-bill face mask (11) is shown patterned on a web of material. The duckbill face mask (11) is patterned on a multilayer web of materials that includes a multilayer upper portion of the face mask (shown) and the multilayer lower portion of the face mask (not shown in FIG. 5, but shown in FIG. 6) in layers of the web materials below the upper portion. The upper portion may comprise the upper straps (16, 17) and the top half of the body of the face mask (11), while the lower portion may comprise the lower straps and the bottom half of the body of the face mask (11) (not shown in FIG. 5). As noted above, the upper portion of the face mask (11) and the lower portion of the face mask (11) may be composed of inner layers of made of a material with properties that allow portions to be selectively heat sealed or welded together, such as weld areas (21) of the face mask body along the border perforations (19), while allowing the inner layers of the upper and lower portions to not be adhered against one another to allow the face mask to be opened in to a three-dimensional duck-bill shape with separate upper and lower straps.

Likewise, the materials of the layers of the upper portions of the face mask may be compatible to allow the materials to seal together to avoid delamination of the upper face mask straps (16, 17) and the same for the layers of the lower portion of the face mask straps (not shown in FIG. 5). Various patterns of perforations (12, 13) may be included on the web materials to define the face mask straps (16, 17) of any desired length. A malleable nosepiece (18) is preferably adhered to the outer layer of the upper portion of the face mask. The finished face masks may be wound onto a roll to be dispensed from a mask dispenser directly off a roll where each mask is torn at the border perforations (19) to separate it from the trailing mask on the roll. Alternatively, the perforations at the face mask border (19) may instead be through-cuts when the masks (11) are manufactured, if it is desired for the face masks (11) to be stacked individually in packaging for individual dispensing without the need for wearers to tear the mask off the roll.

Referring to FIG. 6, an exemplary method is shown for making one embodiment of a duck bill style face mask, for example, like the face mask (11) shown in FIG. 5. A web of multilayer material (30) is provided that may optionally include reinforcing layers (31, 32) along the top, or upper portion and/or along the bottom, or lower portion, where the upper straps (34) and lower straps (35) are to be patterned. The web of materials passes through machine station A (33) where the straps (34, 35) are patterned on the web by perforating the layers of material on both the top portion and bottom portion of the web on either side of the area where the face mask body (37, 39) is to be located. The process of patterning the straps (34, 35) in station A (33) may, for example, comprise a die with a cutter in the shape of the pattern pressing down on the web in order to impart the perforated pattern onto the web of multilayer material (30). The station A (33) may also impart perforations at the border between each individual mask. Station A (33) may also crease, perforate, or bend the center of the web material of each mask where the mask will be folded in half at station B (38).

A nose contouring piece (36) may be adhered to the web of material in machine station A (33). The nose contouring piece (36) may be adhered near the upper edge of the body (39) of the face mask close to the upper portion, or it may be adhered near a lower edge of the upper portion close to the body (39) of the face mask. Alternatively, the nose contouring (36) piece may be adhered to the web prior to the reinforcing layer is disposed on the web so that the nose contouring piece is sandwiched between the reinforcing layer and the underlying layers of the web of material.

The web with partially formed product is passed from station A (33) to machine station B (38), where the web is folded in half at the central crease or perforation imparted by station A (33). The folding process may bring the lower portion of the face mask and the lower straps (35) under the upper portion of the face mask and the upper set of straps (34). The folding process may also bring the upper half (39) of the face mask body under the lower half (37) of the face mask body. When folded under, the set of straps (35) and the lower half of the face mask body (37) may aligned with upper set of straps (34) and upper half of the face mask body (39), such that the tear lines 41 are aligned. Additionally, the mask may be symmetrical on either side of the fold. Although the mask is illustrated with a symmetrical/mirror image pattern when folded, though not necessarily to scale, depending on the mask design the web need not necessarily be folded in half. The strap patterns on the upper portion (34) and lower portion (35) need not be symmetrical. Likewise, the mask portions on one side (37) or the other side (39) need not be symmetrical.

Machine Station B (38) also may perforate or further perforate the web to define the edge borders (40) of the face mask body and the tear lines (41) between successive face masks. The two side edge areas (42) of face mask body may also be sealed by heat welding or ultrasonic welding or other sealing techniques in order to form the duck-bill portion of the face mask. See for example, U.S. Patent Application Publication No. 2014/0224261 A1, which is incorporated by reference herein in its entirety, for examples of sealing and bonding techniques. The sealing process may seal the lower half of the body (37) to the upper half of the body (39) along the two edges 40, wherein the central fold forms the third edge. The edges of the upper and lower halves of the body of the face mask adjacent to the upper and lower straps (34, 35) remain free to be separated by the end user, creating a duck-bill or cone-like shape due to the three other connected edges. The completed face mask patterned on the web may be wound onto a roll for dispensing in a roller dispenser. Alternatively, the face masks may be cut through along the borders and separated and stacked for bulk packaging and individual dispensing without the need for wearer's to tear the masks off a roll.

A person of ordinary skill in the art will understand that the present disclosure includes various alternatives and modifications to the illustrative examples shown herein with any combination of features and elements including all equivalents thereof.

The invention claimed is:

1. A disposable face mask comprising
an upper portion of the face mask,
a lower portion of the face mask, and
a body portion of the face mask extending between the upper portion and lower portion,
wherein the upper portion and the lower portion of the face mask each adjoin monolithically formed therewith face mask straps defined by perforations in an area of a web of material used to form the face mask and straps,
wherein the perforations allow the straps to be partially separated and utilized for securing said face mask to a wearer's face.

2. The disposable face mask of claim 1 further comprising a reinforcement layer disposed on the area of the web of material forming the face mask straps, whereby the reinforcement layer provides added tensile strength over the face mask straps and an area adjoining the face mask straps and the body portion of the face mask.

3. The disposable face mask of claim 2 further comprising a nose contour piece adhered to the upper portion of the face mask, wherein the reinforcement layer is disposed over the nose contour piece.

4. The disposable face mask of claim 1 further comprising a nose contour piece adhered to the upper portion of the face mask.

5. The disposable face mask of claim 2, wherein the reinforcement layer has a tensile strength between 20 and 35 MPa.

6. The disposable face mask of claim 1 wherein the face mask is one of a plurality of face masks on a roll of face masks.

7. The disposable face mask of claim 6 wherein perforations on the roll of face masks separate adjacent face masks from each other, wherein the perforations allow each one of the plurality of face masks to be separated from each other.

8. The disposable face mask of claim 1 wherein the face mask if formed from a multilayer web of material, wherein layers of the web are welded together at select locations.

9. The disposable face mask of claim 1 wherein the upper portion and lower portion are disposed at opposite ends of the body portion.

10. The disposable face mask of claim 9 wherein the face mask straps include two upper face mask straps formed by the perforation patter in the upper portion and two lower face mask straps formed by the perforation pattern in the lower power, each on the face mask straps disposed near a different corner of the body portion.

11. A method of making a plurality of face mask, the method comprising
providing a web of material,
providing a plurality of perforations in a first area of the web of material to define face mask straps that adjoin a second area of the web of material that defines a face mask body,
welding the web of material at select locations to adhere together layers in the web of material together at a border between a first face mask of the plurality of face masks and a second face mask of the plurality of face masks at the web of material, and
perforating the web of materials along the border such that the first face mask may be separated from the second face mask formed in the web of material,
wherein the plurality of perforations defining the straps allow the straps to be pulled away from the face mask body yet remained adjoined to the face mask body,
whereby a wearer may secure the first face mask to a wearer's head with said straps.

12. The method of claim 11 further comprising providing a reinforcing layer on the web of material, wherein the reinforcing layer covers at least the first area of the web of materials defining the straps and a portion of the second area that defines the face mask body.

13. The method of claim 12 further comprising providing a nose contour piece in the second area of the web of material, wherein the reinforcing layer secures the nose contour piece to the web of material.

14. The method of claim 11 further comprising providing a nose contour piece in the second area of the web of material, and adhering the nose contour piece to the web of material.

15. The method of claim 11 further comprising providing a plurality of perforations in a third area of the web of material to define face mask straps that adjoin the second area of the web of material that defines the face mask body.

16. The method of claim 15 wherein the face mask straps in the third area of the web of material adjoin the face mask body at positions on the opposite side of the face mask body where the face mask straps in the first area of the web of materials adjoin the face mask body.

17. The method of claim 15 wherein the perforations are made to define the face mask straps, and then the web of material is folded over, and then the web of material if welded and perforated to define the border of the face mask.

18. The method claim 11 further comprising winding the web of material having the face mask and straps formed therein onto a roll.

19. A method for dispensing face masks, the method comprising
placing a roll of a plurality of face masks having straps monolithically formed therewith on a web of material into a dispenser,
pulling out a first face mask from said dispenser,
separating the first face mask from a second face mask form on the web of material, the second face mask trailing the first face mask,
separating a distal end and a substantial length of the face mask straps from a body of the first face mask along perforations in the web of material leaving the proximal ends of the face mask straps adjoined to the body of the face mask, and tying the separated face mask straps together on a back of a wearer's head to securely attach the first face mask to the wearer.

20. A roll of face masks comprising a continuous web of material having a plurality of face masks patterned therein, the plurality of face masks comprising
    a face mask body portion, and
    a plurality of straps monolithically formed with the face mask body and defined by a plurality of perforations, wherein a face mask of the plurality of face masks may be separated from the continuous web along a perforation defining a border of the face mask and the plurality of straps may be separated along the perforations to form a set of straps of sufficient length to be tied behind a face mask wearer's head to secure the face mask to the wearer's face.

\* \* \* \* \*